(12) United States Patent
Kato et al.

(10) Patent No.: US 10,058,043 B2
(45) Date of Patent: Aug. 28, 2018

(54) HYDROPONIC CULTIVATION APPARATUS

(71) Applicant: PANASONIC INTELLECTUAL PROPERTY MANAGEMENT CO., LTD., Osaka (JP)

(72) Inventors: Sayaka Kato, Osaka (JP); Hiroshi Yano, Osaka (JP); Ayumi Sakai, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 14/912,513

(22) PCT Filed: Jun. 5, 2014

(86) PCT No.: PCT/JP2014/003001
§ 371 (c)(1),
(2) Date: Feb. 17, 2016

(87) PCT Pub. No.: WO2015/045219
PCT Pub. Date: Apr. 2, 2015

(65) Prior Publication Data
US 2016/0198653 A1    Jul. 14, 2016

(30) Foreign Application Priority Data

Sep. 26, 2013    (JP) ................................. 2013-200385

(51) Int. Cl.
*A01G 31/00*    (2018.01)
*A01G 31/02*    (2006.01)

(52) U.S. Cl.
CPC ........ *A01G 31/02* (2013.01); *A01G 2031/006* (2013.01); *Y02P 60/216* (2015.11)

(58) Field of Classification Search
CPC ... A01G 31/00; A01G 31/02; A01G 2031/006
(Continued)

(56) References Cited

U.S. PATENT DOCUMENTS 4,245,433 A * 1/1981 Sjostedt ................. A01G 31/00
47/59 R
4,486,977 A * 12/1984 Edgecombe ........... A01G 31/02
47/59 R
(Continued)

FOREIGN PATENT DOCUMENTS

CN    201088052    7/2008
JP    01320944 A * 12/1989 ............. A01G 31/00
(Continued)

*Primary Examiner* — David J Parsley
*Assistant Examiner* — Danielle A Clerkley
(74) *Attorney, Agent, or Firm* — Greenblum & Bernstein, P.L.C.

(57) ABSTRACT

A hydroponic cultivation apparatus comprises: at least cultivation containers for growing the plants; a plurality of plant supporting portions to support the plants; a plurality of nutrient solution supplying portions to supply nutrient solutions; a plurality of first switching valves; a plurality of nutrient solution discharging portions to discharge the nutrient solutions; a plurality of second switching valves; a plurality of pH value detecting portions to detect pH values of the nutrient solutions; a receptacle portion to store the nutrient solutions discharged from the plurality of nutrient discharging portions; nutrient solution circulating portions to send the nutrient solutions from the receptacle portion; and a controlling portion to control opening and closing operations of the first switching valves and the second switching valves based on the pH values detected by the pH value detecting portions.

5 Claims, 4 Drawing Sheets

(58) Field of Classification Search
USPC ......... 47/59 R, 60, 62 R, 63, 1.01 R, 58.1 R, 47/62 N
See application file for complete search history.

(56) References Cited

U.S. PATENT DOCUMENTS

| | | | | |
|---|---|---|---|---|
| 4,971,447 A * | 11/1990 | Mueller | ................ | G01J 3/2803 250/226 |
| 5,590,490 A * | 1/1997 | Kikuchi | ................ | A01G 31/00 47/59 R |
| 2013/0305603 A1* | 11/2013 | Azoulay | ................ | A01G 31/02 47/60 |

FOREIGN PATENT DOCUMENTS

| JP | 5-161432 | 6/1993 | | |
|---|---|---|---|---|
| JP | 7-194265 | 8/1995 | | |
| JP | 5608799 B1 * | 10/2014 | ............. | A01G 31/02 |

* cited by examiner

HYDROPONIC CULTIVATION APPARATUS

TECHNICAL FIELD

The present invention relates to a hydroponic cultivation apparatus configured to grow plants.

BACKGROUND ART

As for techniques for cultivating plants without using soil, patent literatures 1 and 2 described below are known.

The hydroponic cultivation apparatus disclosed in the patent literature 1 is provided with a plurality of cultivation beds, which have nutrient solutions for cultivation separated. Therefore, according to the hydroponic cultivation apparatus, even if a plant disease is caused in an arbitrary cultivation bed, it is possible to prevent the disease from spreading.

The purification apparatus disclosed in the patent literature 2 purifies a nutrient solution, which grows plants cultivated in hydroponics, by means of ozone and ultraviolet radiation.

CITATION LIST

Patent Literature

[PTL 1] Japanese Patent Application Publication No. 2013-111046
[PTL 2] Japanese Patent Application Publication No. 2013-103184

SUMMARY OF INVENTION

Meanwhile, the hydroponic cultivation apparatus disclosed in the patent literature 1 described above does not comprise any detecting mechanism for detecting a plant disease. Therefore, in a case where a plant disease is caused, the disease spreads to other plants in the same cultivation bed.

The technique disclosed in the patent literature 2 is to purify a nutrient solution by means of ozone and ultraviolet radiation. Thus, the technique cannot completely prevent bacteria from being generated out of plants catching a disease, even if it achieves the purification of the nutrient solution. The purification of the nutrient solution by the purification apparatus can not necessarily prevent a plant disease. Therefore, even if the purification apparatus is used, once the plant disease is caused, it is impossible to prevent the plant disease from spreading.

The present invention has been made with the foregoing situation taken into consideration. An object of the present invention is to provide a hydroponic cultivation apparatus capable of suppressing the spread of a disease to another plant, even if one plant catches the disease.

A hydroponic cultivation apparatus according to a first aspect of the present invention is the hydroponic cultivation apparatus configured to grow plants, characterized in that the apparatus comprises: at least two cultivation containers for growing the plants, respectively; a plurality of plant supporting portions that are provided to the cultivation containers and configured to support the plants above the cultivation containers, respectively; a plurality of nutrient supplying portions that are provided to the cultivation containers and configured to supply nutrient solutions to the cultivation containers, respectively; a plurality of first switching valves provided to the nutrient supplying portions, respectively; a plurality of nutrient discharging portions that are provided to the cultivation containers and configured to discharge the nutrient solutions from the cultivation containers, respectively; a plurality of second switching valves provided to the nutrient discharging portions, respectively; a plurality of pH value detecting portions that are provided to the cultivation containers and configured to detect pH values of the nutrient solutions stored in the cultivation containers, respectively; a receptacle portion configured to store the nutrient solutions discharged from the plurality of nutrient discharging portions; one or more nutrient solution circulating portions configured to send the nutrient solutions from the receptacle portion to the nutrient solution supplying portions, respectively; and one or more controlling portions configured to control at least opening and closing operations of the second switching valves based on the pH values detected by the pH value detecting portions, respectively.

A hydroponic cultivation apparatus according to a second aspect of the present invention is the hydroponic cultivation apparatus according to the first aspect, characterized in that the one or more controlling portions make interlocked with each other opening and closing operations of the first switching valve and the second switching valve in the respective cultivation containers.

A hydroponic cultivation apparatus according to a third aspect of the present invention is the hydroponic cultivation apparatus according to the first aspect, characterized in that the one or more controlling portions control the second switching valve so as to perform a closing operation in the cultivation container in which the pH value detected by the pH value detecting portion has become equal to or larger than a prescribed threshold value.

A hydroponic cultivation apparatus according to the fourth aspect of the present invention is the hydroponic cultivation apparatus according to anyone of the first to third aspects, characterized in that the plurality of nutrient solution supplying portions include a supplying portion common to the plurality of cultivation containers, and at least one of the one or more nutrient circulating portions is connected to the supplying portion.

A hydroponic cultivation apparatus according to the fifth aspect of the present invention is the hydroponic cultivation apparatus according to any one of the first to fourth aspects, characterized in that the nutrient solutions contain an acid-base indicators, respectively.

DESCRIPTION OF EMBODIMENTS

Figure 1:
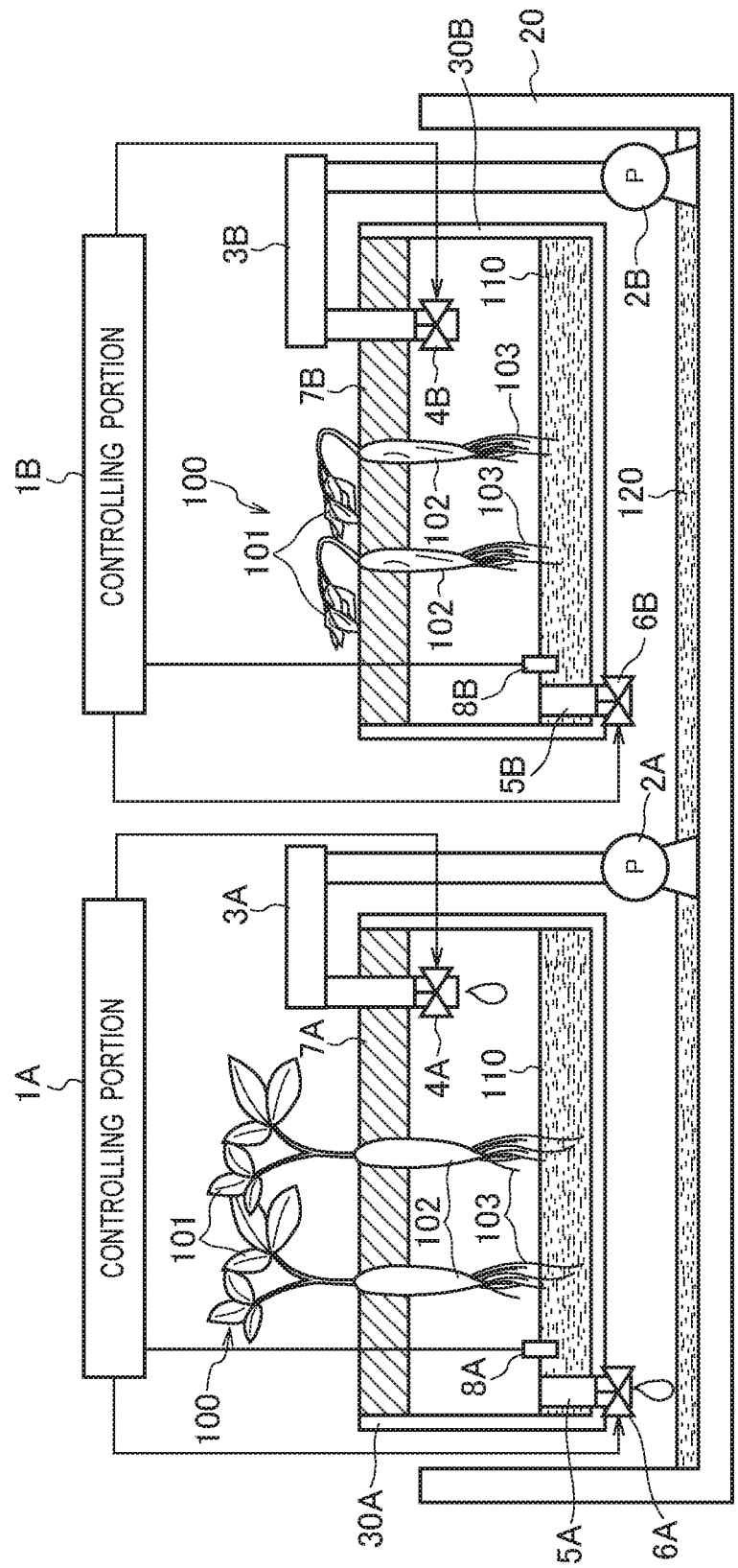
FIG. 1 is a block diagram showing a configuration example of a hydroponic cultivation apparatus of an embodiment of the present invention.

Referring to the drawings, detailed descriptions will be hereinbelow provided for the embodiments of the present invention.

The hydroponic cultivation apparatus according to the first embodiment of the present invention is configured as shown FIG. 1. The hydroponic cultivation apparatus is to perform hydroponics in which no soil is used for growing a plant 100.

The hydroponic cultivation apparatus cultivates the plant 100 by supplying a liquid to at least a lateral root (a secondary root) 103. In the present embodiment, it is explained that the hydroponic cultivation apparatus grows a plant, for example, such a root crop as the plant 100, which stores in its underground portion nourishment synthesized in its aboveground portion.

As one example of the root crop, such a ginseng (panax ginseng, asiatic ginseng) as shown in FIG. 1 is given. Although the ginseng is exemplified as the plant 100 in the present embodiment, the plant 100 is not limited to the ginseng. Further, in the present embodiment, it is explained that the liquid is supplied to the plant 100. As one example of the liquid, water or a nutrient solution prepared by adding a nutrient to water is given.

The hydroponic cultivation apparatus comprises two cultivation containers 30A,30B. The cultivation containers 30A,30B are to cultivate many plants 100. Accordingly, the hydroponic cultivation apparatus may comprise at least two cultivation containers, which are not the two cultivation containers 30A,30B of the present embodiment.

The two cultivation containers 30A,30B store nutrient solutions 110 at bottom portions thereof, respectively. The hydroponic cultivation apparatus includes the cultivation containers 30A,30B that are provided with plant supporting portions 7A,7B configured to support main roots 102 of the plants 100, respectively. The hydroponic cultivation apparatus supplies water to the lateral roots 103 of the plants 100 in a state of supporting the plants 100.

The plant supporting portions 7A,7B are provided to the cultivation containers 30A,30B, respectively. The plant supporting portions 7A,7B support the plants 100 above the cultivation containers 30A,30B, respectively. The plant supporting portions 7A,7B are made with sponges provided so as to cover above the cultivation containers 30B,30B, respectively.

The plant supporting portions 7A,7B include a plurality of through-holes for the plants 100, respectively. Therefore, when the plants 100 grow, the plant supporting portions 7A,7b support the plants 100 by generating friction forces on side surfaces thereof, respectively. Please note that if it is possible to support the plants 100, any means, for example, a means of suspending an aboveground portion with a string, may be adopted instead of the plant supporting portions 7A,7B.

As for the plants 100 supported by the plant supporting portions 7A,7B, their upper ends of the main roots 102 are exposed from the plant supporting portions 7A,7B, respectively. A stem and leaves 101 extend from the upper end of the main root 102 toward above. Above the hydroponic cultivation apparatus, for example, a lighting portion is provided. The lighting portion is made with a plurality of LEDs, for example. The stem and leaves 101 can photosynthesize by receiving light emitted from the lighting portion.

With the plants 100 supported, the lateral roots 103 of the plants 100 are immersed into the nutrient solutions 110 stored in the at the bottom portions of the cultivation containers 30, respectively. Thereby, the hydroponic cultivation apparatus supplies the lateral roots 103 with water.

Further, the hydroponic cultivation apparatus comprises nutrient solution supplying portions 3A,3B. The nutrient solution supplying portions 3A,3B are provided to the cultivation containers 30A,30B, respectively. The nutrient solution supplying portions 3A,3B supply the nutrient solutions 110 to the cultivation containers 30A,30B, respectively. The nutrient solution supplying portions 3A,3B are made, for example, with pipes penetrating the plant supporting portions 7A,7B from above, respectively.

Further, the hydroponic cultivation apparatus comprises a plurality of first switching valves 4A,4B provided to the nutrient solution supplying portions 3A, 3B, respectively. The first switching valves 4A,4B may be solenoid valves operated by means of control signals from controlling portions 1A,1B, respectively. In this case, as to the first switching valves 4A,4B, their opening and closing operations are controlled by the controlling portions 1A,1B, respectively. Thereby, the first switching valves 4A,4B control starts and stops of the supplies of the nutrient solutions from the nutrient solution supplying portions 3A, 3B to the cultivation containers 30A,30B, respectively.

Please note that the first switching valves 4A, 4B may be not only the solenoid valves controlled automatically, but also valves opened and/or closed by hand.

Further, the hydroponic cultivation apparatus comprises nutrient solution discharging portions 5A,5B provided to the cultivation containers 30A,30B, respectively. The nutrient solution discharging portions 5A,5B discharge the nutrient solutions 110 from the cultivation containers 30A,30B, respectively. The nutrient solution discharging portions 5A,5B are configured by pipes having openings at prescribed heights in the cultivation containers 30A,30B, respectively. The nutrient solutions 110 can be discharged from the nutrient solution discharging portions 5A,5B, when reaching the prescribed heights, respectively.

Further, the hydroponic cultivation apparatus comprises a plurality of second switching valves 6A,6B provided to the nutrient solution discharging portions 5A,5B, respectively. For the second switching valves 6A,6B, it is possible to use solenoid valves that are operated based on control signals from the controlling portion 1A,1B, respectively. As for the second switching valves 6A,6B, their opening and closing operations are controlled by the controlling portion 1A,1B, respectively. Thereby, the second switching valves 6A,6B control starts and stops of the discharges of the nutrient solutions from the cultivation containers 30A,30B to the outside of the cultivation containers 30A,30B, respectively. Please note that the second switching valves 6A,6B may be opened and/or closed not only automatically, but also by hand.

The nutrient solutions 110, which have been discharged from the nutrient solution discharging portions 5A,5B, respectively, are to be stored in a receptacle portion 20. The receptacle portion 20 can be implemented by a tank provided below the cultivation containers 30A,30B. The nutrient solution 120 discharged from the respective cultivation containers 30A,30B is mixed at a bottom portion of the receptacle portion 20.

The nutrient solution 120 is supplied toward the nutrient solution supplying portions 3A,3B by nutrient solution circulating portions 2A,2B, respectively. The nutrient solution circulating portions 2A,2B are configured, for example, by pumps that suck and discharge liquids, respectively. The nutrient solution 120 supplied from the nutrient solution circulating portions 2A,2B to the nutrient solution supplying portions 3A,3B is supplied to the cultivation containers 30A, 30B through the first switching valves 4A,4B, respectively. Thereby, the nutrient solutions are circulated between the receptacle portion 20 and the cultivation containers 30A, 30B, respectively.

Further, the hydroponic cultivation apparatus comprises pH value detecting portions 8A,8B provided to the cultivation containers 30A,30B, respectively. The pH value detecting portions 8A,8B detect pH values of the nutrient solutions 110 stored in the cultivation containers 30A,30B, respectively. The pH value detecting portions 8A,8B send the detected pH values to the controlling portions 1A,1B, respectively.

The controlling portions 1A,1B perform controls based on the pH values of the nutrient solutions 110, respectively. The controlling portions 1A,1B obtain the pH values detected by the pH value detecting portions 8A,8B, respectively. The controlling portions 1A,1B control the opening and closing operations of the second switching valves 6A,6B based on the pH values, respectively. For example, the controlling portions 1A,1B may control the opening and closing of the second switching valves 6A,6B so that the pH values become prescribed values, respectively.

The second switching valves 6A,6B may be opened and closed by another way. For example, only in a case where the pH values are not abnormal, the nutrient solutions may be circulated by opening the first switching valves 4A,4B as well as the second switching valves 6A,6B, respectively, at every fixed period of time.

It may be adopted as still another way that the first switching valves 4A,4B and the second switching valves 6A,6B are opened and/or closed by hand. In this case, the first switching valves 4A,4B and the second switching valves 6A,6B may not be solenoid valves. By outputting an alert sound, for example, the controlling portions 1A,1B may urge an operating person to perform manual opening and/or closing operations of the first switching valves 4A,4B and the second switching valves 6A,6B, respectively.

Please note it is desirable that that the controlling portions 1A, 1B put into closed states not only the second switching valves 6A,6B, but also the first switching valves 4A,4B, respectively. According to the same, the nutrient solution 120 is not supplied to the cultivation container 30A,30B uselessly.

The hydroponic cultivation apparatus may detect not the pH value but another value, if it is possible to detect defective growth such as a disease or rottenness. For example, the hydroponic cultivation apparatus may detect such values as EC (Electric Conductivity) values of the nutrient solutions. The hydroponic cultivation apparatus may detect the EC (Electric Conductivity) values of the nutrient solutions in addition to the pH values and perform the controls of the first switching valves 4A,4B and the second switching valves 6A,6B referring to the both values.

As described above, the hydroponic cultivation apparatus performs cultivation by circulating the nutrient solutions supplied to the plants 100. The hydroponic cultivation apparatus comprises at least two cultivation containers 30A, 30B for growing the plants 100, respectively. Further, the hydroponic cultivation apparatus comprises the plurality of plant supporting portions 7A,7B that are provided to the cultivation containers 30A,30B and configured to support the plants 100 above the cultivation containers 30A,30B, respectively. Further, the hydroponic cultivation apparatus comprises the plurality of nutrient solution supplying portions 3A,3B that are provided to the cultivation containers 30A,30B and configured to supply the nutrient solutions to the cultivation containers 30A,30B, respectively. Further, the hydroponic cultivation apparatus comprises the plurality of first switching valves 4A,4B provided to the nutrient solution supplying portions 3A,3B, respectively. Further, the hydroponic cultivation apparatus comprises the plurality of nutrient solution discharging portions 5A,5B that are provided to the cultivation containers 30A,30B and configured to discharge the nutrient solutions from the cultivation containers 30A,30B, respectively. Further, the hydroponic cultivation apparatus comprises the plurality of second switching valves 6A,6B provided to the nutrient solution discharging portions 5A,5B, respectively. Further, the hydroponic cultivation apparatus comprises the plurality of pH value detecting portions 8A,8B that are provided to the cultivation containers 30A,30B and configured to detect the pH values of the nutrient solutions 110 stored in the cultivation containers 30A,30B, respectively. Further, the hydroponic cultivation apparatus comprises the receptacle portion 20 configured to store the nutrient solutions 110 discharged from the plurality of nutrient discharging portions 5A,5B, respectively. Further, the hydroponic cultivation apparatus comprises the nutrient solution circulating portions 2A,2B configured to send the nutrient solutions from the receptacle portion 20 to the nutrient solution supplying portions 3A,3B, respectively. Further, the hydroponic cultivation apparatus comprises the controlling portion 1A,1B configured to control at least the opening and closing operations of the second switching valves 6A, 6B based on the pH values detected by the pH value detecting portions 8A,8B, respectively.

According to the above hydroponic cultivation apparatus, the second switching valves 6A,6B provided to the cultivation containers 30A,30B are controlled based on the pH values of the nutrient solutions 110 stored in the cultivation containers 30A,30B, respectively. Thereby, according to the above hydroponic cultivation apparatus, it can be prevented that the nutrient solution 110 discharged from one of the cultivation containers 30A,30B in which a disease of the plants 100 spreads is mixed with the nutrient solution 120 to be supplied to the other of the cultivation containers 30A, 30B.

Further, according to the above hydroponic cultivation apparatus, in a case where not only a disease of the plants 100 but also any abnormality thereof is detected in each of the cultivation containers 30A,30B, it is possible to stop the circulation of the nutrient solution 120 for the respective cultivation containers 30A,30B. As the abnormality, for instance, an abnormality of the nutrient solutions 110,120 and the spread of fungi in the cultivation container 30 are exemplified.

Figure 2:
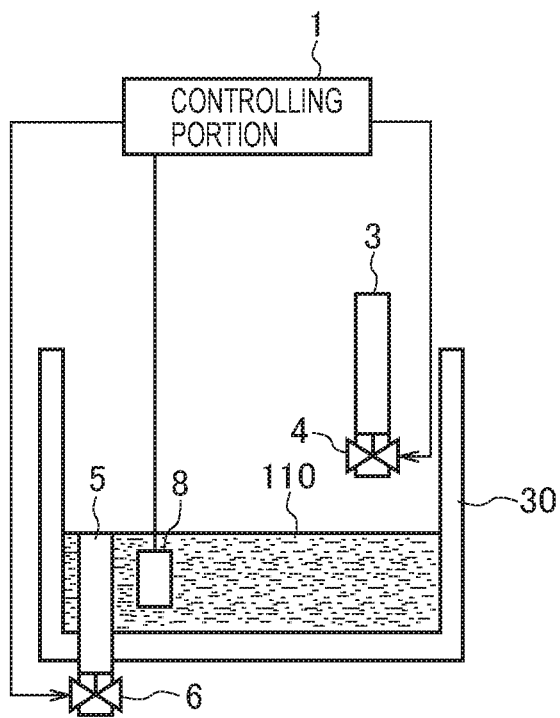
FIG. 2 is a block diagram showing a connection relation to a controlling portion of the hydroponic cultivation apparatus of the embodiment of the present invention.

In the hydroponic cultivation apparatus described above, it is desirable that the controlling portions 1A,1B make interlocked with each other opening and closing operations of the first switching valves 4A,4B and the second switching valves 6A,6B in the cultivation containers 30A,30B, respectively. Thus, as shown in FIG. 2, the controlling portion 1 sends control signals to not only the second switching valves 6A,6B, but also the first switching valves 4A,4B, respectively.

More specifically, in a case where the pH values have become equal to or larger than prescribed threshold values, the discharges of the nutrient solutions 110 from the cultivation containers 30A,30B are stopped by putting the second switching valves 6A,6B into closed states, respectively. Almost simultaneously, the first switching valves 4A,4B are put into closed states, respectively. The above hydroponic cultivation apparatus performs control to put into closed states the first switching valves 4A,4B as well as the second switching valves 6A,6B.

Therefore, it is possible to properly adjust amounts of the nutrient solutions 110 in the cultivation containers 30A, 30B. For example, it is possible to make the first switching valves 4A,4B and the second switching valves 6A,6B interlocked with each other so as to supply the cultivation containers 30A, 30B with the same amounts as those discharged from the cultivation containers 30A, 30B, respectively.

Further, in the hydroponic cultivation apparatus, the controlling portions 1A,1B may control at least the second switching valves 6A,6B so as to perform closing operations, respectively, in the cultivation containers 30A, 30B in which the pH values detected by the pH value detecting portions 8A,8B have become equal to or larger than prescribed threshold values, respectively.

Figure 3:
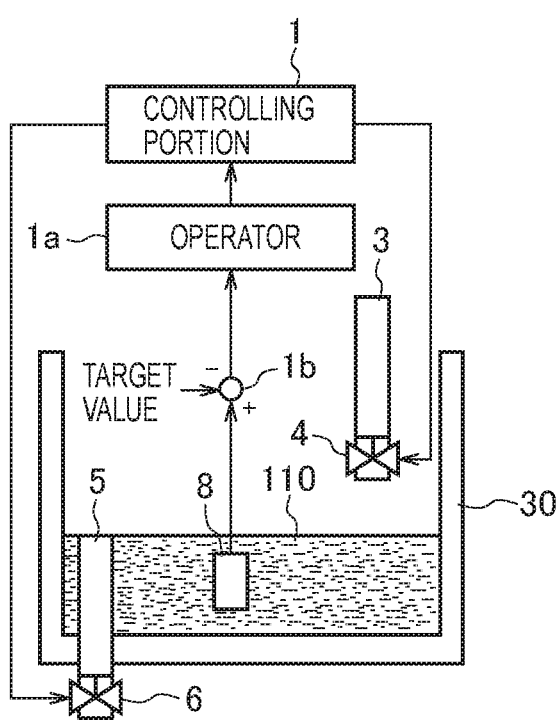
FIG. 3 is a block diagram showing a configuration example for controlling by means of a threshold value in the hydroponic cultivation apparatus of the embodiment of the present invention.

In the hydroponic cultivation apparatus, target values of the pH values are set as shown in FIG. 3. The target values are the pH values of the nutrient solutions 110 desirable for growths of the plants 100, respectively. For instance, the controlling portions 1A,1B are configured by microcomputers and memorizes the target values. Further, the hydroponic cultivation apparatus comprises an operator 1a and an adder 1b.

In the hydroponic cultivation apparatus, the pH value detected by the pH value detecting portion 8 is sent to the adder 1b. The adder 1b sends the difference between the pH value detected and the target value to the operator 1a.

The operator 1a determines whether or not the value of the difference sent from the adder 1b exceeds a prescribed threshold value. The pH value of the nutrient solution 110 is increased by ammonia generated due to rottenness of the lateral root 103. Therefore, the operator 1a sets the prescribed threshold value allowable for the target value. The operator 1a sends the controlling portion 1 an operated result as to whether or not the pH value corresponding to the target value is equal to or larger than the prescribed threshold value.

In a case where the operated results obtained are that the pH values corresponding to the target values are equal to or larger than the prescribed threshold values, the controlling portion 1 controls at least the second switching valves 6A,6B, respectively. In other words, the controlling portion 1 controls at least the second switching valves 6A,6B so as to perform closing operations, in the cultivation containers 30 in which the pH values detected are equal to or larger than the prescribed threshold values set for the differences exceeding the target values, respectively.

As for the cultivation containers 30 in which abnormalities in the pH values of nutrient solutions 110 are detected, the hydroponic cultivation apparatus may control the first switching valves 4A,4B as well as the second switching valves 6A,6B so as to be normally closed. After putting into closed states the first switching valves 4A,4B as well as the second switching valves 6A,6B, the controlling portion 1 determines whether the pH values in the cultivation containers 30 are not abnormal, respectively.

In the above hydroponic cultivation apparatus, for example, in a case where the nutrient solution 110 is exchanged in the cultivation container 30 in which the pH value is abnormal, the pH value of the nutrient solution 110 becomes normal. Further, although it depends on how to measure the pH value, in a case where the measurement is performed in extremely short time period, there is also a case that a temporary abnormality is detected due to a measurement error. In this case as well, after the abnormality of the pH value is detected, the pH value becomes normal.

In a case where the pH value has been restored from the abnormality, the controlling portion 1 performs controls to put into open states the first switching valves 4A,4B and the second switching valves 6A,6B. Thereby, the controlling portion 1 intermittently circulates the nutrient solution as to the cultivation container 30 in which the abnormality of the pH value is detected.

According to the present hydroponic cultivation apparatus, in a case where the pH value of the nutrient solution 110 in the cultivation container 30 is abnormal, the controlling portion 1 performs controls to put into closed states the first switching valves 4A,4B as well as the second switching valves 6A,6B, respectively. Thereby, it can be prevented that the nutrient solution 110 is mixed with the nutrient solution 120 by the return of the nutrient solution 110 to the receptacle portion 20. Therefore, according to the hydroponic cultivation apparatus, even if the plant 100 is rotten, it is possible to avoid the spread of a disease of the plant 100 to the outside of the cultivation container 30 in which the rotten plant 100 is grown.

According to the hydroponic cultivation apparatus, since the nutrient solution is circulated only in a case where no abnormality of the nutrient solution 110 is detected in the cultivation solution 30, only a non-abnormal nutrient solution 110 can be circulated.

Figure 4:
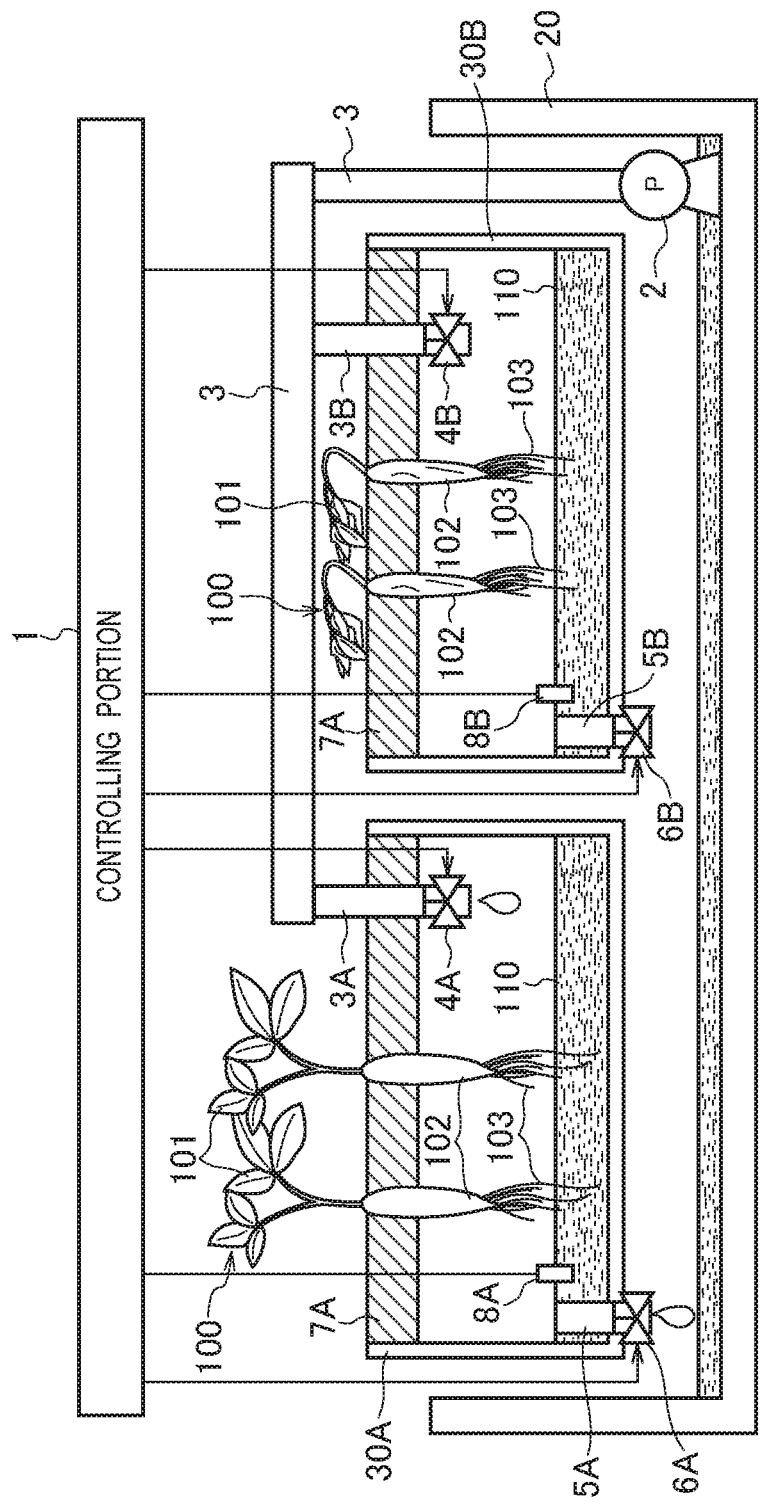
FIG. 4 is a block diagram showing another configuration example of a hydroponic cultivation apparatus of an embodiment of the present invention.

Further, the hydroponic cultivation apparatus described above may include one common nutrient solution supplying portion, instead of the plurality of the nutrient solution supplying portions 3A,3B. As shown in FIG. 4, the hydroponic cultivation apparatus includes a supplying portion 3 common to the plurality of cultivation containers 30A,30B. A nutrient solution circulating portion 2 is connected to the supplying portion 3. The supplying portion 3 includes the nutrient solution supplying portions 3A, 3B branched for each of the cultivation containers 30A,30B. Thereby, the nutrient solution circulating portion 2 supplies the supplying portion 3 with the main root 2.

Since the hydroponic cultivation apparatus is provided with the supplying portion 3 that is common as described above, the single nutrient solution circulating portion 2 has only to be provided for the plurality of cultivation containers 30A,30B that are connected to the supplying portion 3.

According to the hydroponic cultivation apparatus, the nutrient solutions necessary for the respective cultivation containers 30A,30B return to the receptacle portion 20. Therefore, the nutrient solutions necessary for the respective cultivation containers 30A,30B can be shared by the whole hydroponic cultivation apparatus. Thus, according to the hydroponic cultivation apparatus, it is possible to decrease a total amount of the nutrient solution by decreasing a surplus nutrient solution.

In the hydroponic cultivation apparatus described above, it is desirable that the nutrient solution 110, 120 contain an acid-base indicator. The acid-base indicator has a property of changing a color of the nutrient solution corresponding to the pH value.

Figure 5:
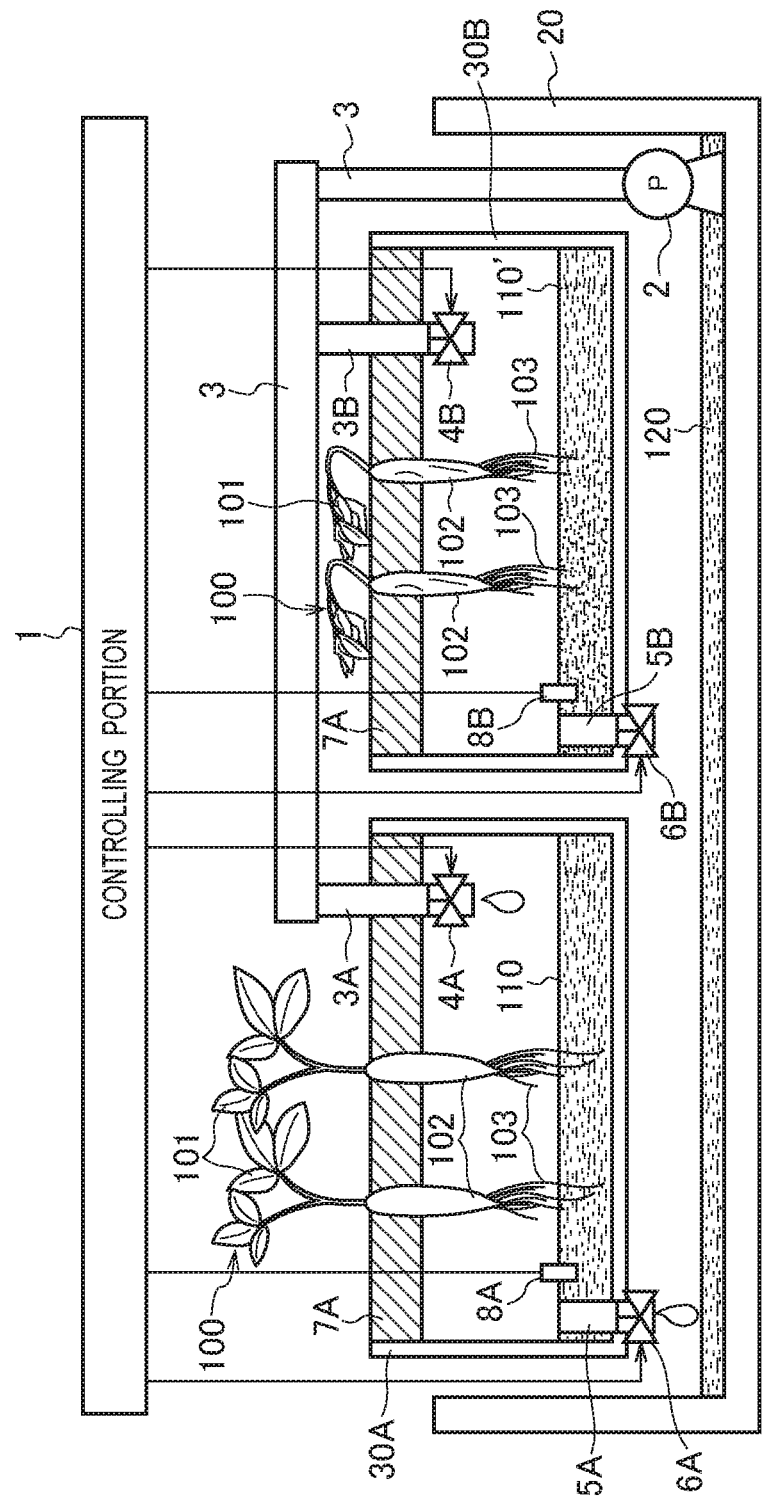
FIG. 5 is a block diagram showing another configuration example of the hydroponic cultivation apparatus of the embodiment of the present invention.

For instance, in a case where a pH value of 6.0 is suitable for the plant 100, an acid-base indicator called neutral red (its color is changed in a case where the pH value is equal to or more than 6.8) is used as one example of the acid-base indicators described above. For example, as shown in FIG. 5, in a case where the pH value exceeds a prescribed value due to rottenness of the plant 100 grown in the cultivation container 30B, a color of the nutrient solution 110' is changed in the cultivation container 30B.

According to the hydroponic cultivation apparatus, since the nutrient solution 110,120 include the acid-base indicator, it is possible to detect the pH value based on a change of a color of the nutrient solution. Thus, according to the hydroponic cultivation apparatus, even in a case of power failure or even when the pH value detecting portions 8A,8B are broken, it is possible to detect an abnormality of the pH value by sight.

It should be noted that the foregoing embodiments are examples of the present invention. For this reason, the present invention is not limited to the foregoing embodiments. It is a matter of course that depending on the design and the like, various changes which may lead to other embodiments can be made to the present invention within a scope not departing from the technical idea concerning the present invention.

All the contents of Japanese Patent Application No. 2013-200385(filed on Sep. 26, 2013) are incorporated herein by reference.

INDUSTRIAL APPLICABILITY

According to the present invention, even if one plant catches a disease, it is possible to suppress the spread of the disease to another plant.

REFERENCE SIGNS LIST

1A, 1B controlling portion
2A, 2B nutrient solution circulating portion
3 supplying portion
3A, 3B nutrient solution supplying portion
4A, 4B first switching valve
5A, 5B nutrient solution discharging portion
7A, 7B plant supporting portion
8A, 8B pH value detecting portion
20 receptacle portion
30A, 30B cultivation container
100 plant
110, 120 nutrient solution

What is claimed is:

1. A hydroponic cultivation apparatus configured to grow plants, wherein the apparatus comprises:
   at least two cultivation containers for growing the plants, respectively;
   a plurality of plant supporting portions that are provided to the cultivation containers and configured to support the plants above the cultivation containers, respectively;
   a plurality of nutrient supplying portions that are provided to the cultivation containers and configured to supply nutrient solutions to the cultivation containers, respectively;
   a plurality of first switching valves provided to the nutrient supplying portions, respectively;
   a plurality of nutrient discharging portions that are provided to the cultivation containers and configured to discharge the nutrient solutions from the cultivation containers, respectively;
   a plurality of second switching valves provided to the nutrient discharging portions, respectively;
   a plurality of pH value detecting portions that are provided to the cultivation containers and configured to detect pH values of the nutrient solutions stored in the cultivation containers, respectively;
   a receptacle portion configured to store the nutrient solutions discharged from the plurality of nutrient discharging portions;
   one or more nutrient solution circulating portions configured to send the nutrient solutions from the receptacle portion to the nutrient solution supplying portions, respectively; and
   one or more controlling portions configured to control at least opening and closing operations of the second switching valves based on the pH values detected by the pH value detecting portions, respectively.

2. The hydroponic cultivation apparatus according to claim 1, wherein
   the one or more controlling portions make opening and closing operations of the first switching valve and the second switching valve interlocked with each other.

3. The hydroponic cultivation apparatus according to claim 1, wherein
   the one or more controlling portions control the second switching valve so as to perform a closing operation in the cultivation container in which the pH value detected by the pH value detecting portion has become equal to or larger than a prescribed threshold value.

4. The hydroponic cultivation apparatus according to claim 1, wherein
   the plurality of nutrient solution supplying portions include a supplying portion common to the plurality of cultivation containers, and
   at least one of the one or more nutrient circulating portions is connected to the supplying portion.

5. The hydroponic cultivation apparatus according to claim 1, wherein
   the nutrient solutions contain acid-base indicators, respectively.

* * * * *